United States Patent [19]
Wu et al.

[11] 3,951,210
[45] Apr. 20, 1976

[54] SAND CONTROL METHOD EMPLOYING ASPHALTENES

[75] Inventors: Ching H. Wu; Alfred Brown; Daniel T. Konopnicki, all of Houston, Tex.

[73] Assignee: Texaco Inc., New York, N.Y.

[22] Filed: Feb. 26, 1975

[21] Appl. No.: 553,417

Related U.S. Application Data

[62] Division of Ser. No. 491,985, July 25, 1974, Pat. No. 3,910,351.

[52] U.S. Cl. .............................. 166/288; 166/276
[51] Int. Cl.² .................... E21B 43/04; E21B 43/24
[58] Field of Search ........... 166/288, 294, 302, 276, 166/278, 280

[56] References Cited
UNITED STATES PATENTS

| | | | |
|---|---|---|---|
| 2,427,848 | 9/1947 | Garrison | 166/294 |
| 2,896,716 | 7/1959 | Spurlock | 166/294 |
| 3,003,555 | 10/1961 | Freeman et al. | 166/288 |
| 3,093,192 | 6/1963 | Allen | 166/294 |
| 3,147,805 | 9/1964 | Goodwin et al. | 166/288 |
| 3,180,415 | 4/1965 | Allen | 166/294 |
| 3,217,800 | 11/1965 | Smith | 166/288 X |
| 3,254,716 | 6/1966 | Fitzgerald et al. | 166/288 |
| 3,812,913 | 5/1974 | Hardy et al. | 166/288 |

*Primary Examiner*—Stephen J. Novosad
*Attorney, Agent, or Firm*—T. H. Whaley; C. G. Ries; Jack H. Park

[57] ABSTRACT

This invention relates to a method for treating wells completed in subterranean formations which contain unconsolidated sand particles, so as to form a permeable barrier which will permit the flow of liquids therethrough while restraining the flow of the unconsolidated sand particles into the well bore. The method comprises saturating sand adjacent the well bore to be treated with petroleum having a high asphaltic content and optionally thereafter contacting the asphaltic petroleum with a solvent capable of solubilizing non-asphaltic fractions of the petroleum and precipitating or causing deposition of the asphaltic or bituminous portions of the petroleum. A heated fluid such as steam is thereafter injected into the formation to cause solidification of the asphaltic materials which effectively binds the sand grains together to form a porous mass which will effectively restrain the movement of sand particles in the well bore upon subsequently placing the well on production. Suitable hydrocarbon materials for causing precipitation of the asphaltic or bituminous portions of the petroleum include liquid paraffinic hydrocarbons such as butane, pentane, or hexane, N-methyl-2-pyrrolidone and furfural. Steam or a mixture of steam and non-condensable gas such as nitrogen, or mixture of steam and air are then injected into the formation to dehydrate and otherwise solidify the precipitated asphaltic material.

9 Claims, 1 Drawing Figure

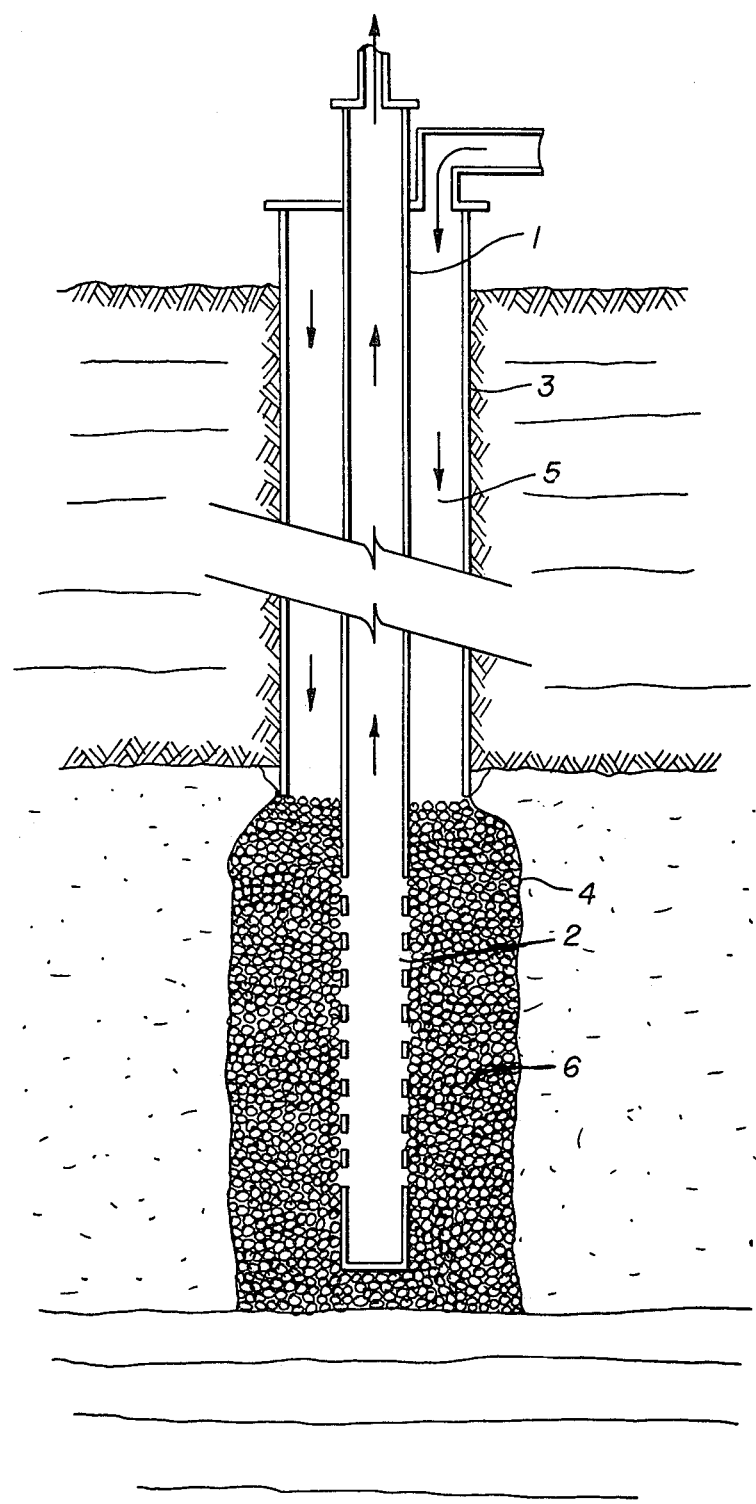

SAND CONTROL METHOD EMPLOYING ASPHALTENES

This is a division, of application Ser. No. 491,985, filed July 25, 1974, now U.S. Pat. No. 3,910,351.

BACKGROUND OF THE INVENTION

1. Field of the Invention

This invention pertains to a method for treating wells penetrated and completed in subterranean earth formations, and more particularly to a method for treating a petroleum containing formation in the immediate vicinity of the well so as to stabilize unconsolidated sand and prevent their migration into or away from the well. Still more particularly, this invention pertains to a method for treating such wells with granular materials saturated with bitumen or bituminous or asphaltic petroleum, contacting the material with a low molecular weight asphaltic or paraffinic hydrocarbon or N-methyl-2-pyrrolidone or furfural to cause precipitation of asphalt, and then introducing steam to solidify the bitumen and bind the sand grains together.

2. Prior Art and Background

Recovery of formation fluid such as petroleum from a subterranean formation is frequently difficult when the subterranean formation is comprised of one or more incompetent or unconsolidated sand layers or zones. The sand particles in the incompetent or unconsolidated sand zone move or migrate into the well bore during recovery of formation fluids from that zone, or sand particles move away from the well during injection of secondary or tertiary recovery fluids into the formation. In the instance of recovering the fluid from the formation, the movement of sand into the well bore can cause the well to cease production of fluids therefrom. Also, small sand particles can plug small openings and porous masses formed around the well bore for the purpose of restraining the flow of sand, such as screens or slotted liners which are frequently placed in wells for this purpose. Not only can fluid production be reduced or even stopped altogether, if sand particles flow through the well to the surface, considerable mechanical problems can result from passage of abrasive sand particles through pumps and other mechanical devices.

Many techniques have been described in the prior art for preventing or decreasing the flow of sand into well in a course of petroleum production, including the use of sand screens, filters, perforated or slotted liners, etc., around the well. These prior art attempts have been successful in some limited instances, but have not always been entirely satisfactory for a number of reasons. Mechanical devices usually restrain only the larger particle sand and are not completely effective for the purpose of restraining or preventing the flow of fine particles from the formation into the well and ultimately to the surface. Furthermore, the devices interfere with various types of completions and work over operations.

Recently, there have been introduced into the market place by numerous oil field companies, chemical compositions which bond the sand grains together with a resinous plastic material to form a permeable mass which effectively restrains the flow of sand particles from the formation. These methods involve injecting into a sand pack around a well bore, a polymerizable, resinous material, which is later caused to polymerize so as to consolidate formation sand or sand packed around the well for that purpose, to form the desired permeable barrier. Numerous difficulties have been encountered in commercial application and use of this technique, including the difficulty of achieving the even polymerization of the resinous material to the degree necessary to consolidate the sand particles while still maintaining the necessary permeability so that petroleum or other fluid may pass therethrough. Furthermore, the resinous materials are expensive. Recently, many tertiary recovery techniques involving the injection of steam or other fluids into the formation for the purpose of mobilizing viscous petroleum, and this has imposed a still greater burden on sand consolidation techniques, and has particularly caused problems with the plastic consolidation techniques which are sensitive to the high temperature, high pH aqueous fluids frequently employed in such processes. The resinous materials are frequently dissolved or degraded by contact with the hot alkaline fluids used in tertiary recovery processes.

In view of the foregoing discussion, it can be appreciated that there is a substantial, unfulfilled need for a sand control method capable of preventing the flow of unconsolidated sand particles into a well bore during periods of oil recovery or away from a well bore during periods of injection of fluids thereinto. More particularly, there is a need for inexpensive, reliable method of consolidating sand in a formation having an appreciable quantity of unconsolidated sand, which will result in the formation of a permeable mass that will not be adversely affected by subsequent contact with high temperature, alkaline fluid such as steam or caustic.

By the method of the present invention one is able to treat underground formations so as to effect the solidation of granular materials such as sand or gravel into a permeable mass which will effectively restrain the movement of unconsolidated sand partices, which permeable mass will not be appreciably degraded by subsequent contact with hot alkaline fluids such as steam and/or caustic, and generally avoid many of the disadvantages or prior art methods, both mechanical and chemical.

SUMMARY OF THE INVENTION

We have discovered that a permeable mass may be formed, which permeable mass is relatively insensitive to thermal fluids and can be employed in connection with thermal recovery processes, involving the precipitation of asphaltic material from asphaltic petroleum such as bituminous petroleum, onto sand grains located around the well bore by introduction of a suitable asphalt precipitating solvent into the vicinity of the well bore, after which a hot fluid such as steam is introduced to volatalize the solvent and other volatile fractions existing in the vicinity of the well bore and harden the asphaltic material to form a permeable, competent mass, bonding the sand grains together. In some application such as, for example, tar sand deposits, naturally occurring unconsolidated sand and naturally occurring bituminous petroleum may be utilized as the reactants. In other applications, the well bore may be enlarged and suitable sand or other granular material packed into the well bore around the production tubing. The sand is then saturated with asphaltic or bituminous petroleum by several means. The asphalt precipitating solvent is then introduced into the mixture of sand and asphaltic petroleum which causes deposition or precipitation of the asphaltic material onto the sand grain.

Steam is then introduced into the zone to volatilize certain fractions remaining and to solidify the asphalt or bitumen so as to effectively bind the sand grains together. Suitable solvents for causing deposition of the asphaltic material include liquid aliphatic or paraffinic hydrocarbons such as pentane, hexane, etc., as well as N-methyl-2-pyrrolidone or furfural. The steam which is introduced into the precipitated asphalt and sand zone may be saturated or super heated, and optionally may contain a non-condensable gas such as nitrogen or air to aid in maintaining the desired permeability. The permeable solid thus formed is mechanically stable, permits petroleum or other formation fluids to flow therethrough, and resists the detrimental effect of hot alkaline fluids which may be employed in subsequent oil recovery operations.

BRIEF DESCRIPTION OF THE DRAWING

The attached drawing illustrates a well in a tar sand deposit being subjected to the method of our invention for forming a sand restraining, permeable mass around the well bore.

DETAILED DESCRIPTION OF THE INVENTION AND DESCRIPTION OF THE PREFERRED EMBODIMENTS

Briefly, the process of our invention comprises the following steps, which will be described more fully below:

1. Positioning the sand in the well bore and
2. Saturating the sand with bituminous, asphaltic petroleum
3. Introduction of the asphalt precipitating solvent into the sand-bitumen mass, and
4. Introduction of steam into the bitumen-sand mass to cause solidification of the bitumen or asphaltic material to bind the sand grains together.

I. PLACING THE SAND IN THE WELL BORE

According to one aspect of our invention, the sand naturally occurring in the formation, such as for example, in a tar sand deposit, may be utilized for the sand in the formation of the sand restraining, permeable mass according to the process of our invention. Accordingly, one embodiment of the process of our invention involves simply introducing an asphaltic or bituminous petroleum into an unconsolidated sand naturally occurring in the formation to saturate or essentially saturate the same with asphaltic or bituminous petroleum.

In many applications of the process of our invention, the subterranean formation does not contain adequate sand for use in the formation of the permeable barrier, or else the sand particle size or other characteristics are not suitable for use in the formation of the barrier. In those cases it is necessary to introduce sand into the formation for the purpose of forming the permeable barrier.

There are several methods for placing the granular material adjacent the formation in which the sand restraining permeable mass is to be formed. In one embodiment of the process of our invention, a minor amount of the formation adjacent the well to be treated is removed by washing with water or other suitable fluid or by under-reaming to form a small cavity in the immediate vicinity of the well bore. After a suitable amount of material has been removed therefrom, the tubing string or other well hardware is placed in the well, and sand or gravel is placed into the well bore. One suitable method for accomplishing this is to form a slurry of the granular material in water or some other suitable fluid and pump the slurry into the well bore.

The above described procedure may better be understood by reference to the attached figure, in which tubing 1 having perforations near the lower end thereof 2 is contained in well casing 3. The formation material is removed adjacent the petroleum formation to form a cavity 4 which extends outward a small distance from the well bore. The granular material is slurried in fluid; for example, the sand may be slurried in water or water containing other agents, and injected into the annular space 5 between tubing 1 and casing 3. The slurry then passes through the bottom of the annular space, and then through slots 2 into the production well bore where it is pumped to the surface of the earth through the tubing. The granular material filters against the formation and also against the perforations 2 in the production tubing 1, forming a closely packed mass 6 which consists essentially of the granular material packed tightly together. This process is continued until the mass of granular material extends to a point above the top of the perforations 2 and preferably some distance thereabove so that if any shrinkage occurs in subsequent treatment steps, the cavity adjacent perforations 2 will still be completely filled with granular material.

If the sand restraining permeable mass is to be formed from sand or other granular material other than naturally occurring into the formation, the optimum results are obtained at the sand particles size meet certain specific requirements. The sand or other granular material should be selected from the broad range of from about 10 to about 80 mesh, and preferably should be closely spaced within the broad range so that the larger particle sizes utilized are no more than approximately twice the smallest particle sizes employed. For example, sand in the range of 10 to 20 mesh, or 20 to 40 mesh, or 40 to 80 mesh, may be utilized effectively. The reason for this optimum size is that sand particles coarser than about 10 mesh when bonded together according to the process to be described in detail below, result in the formation of a permeable mass whose low channels or pore sizes are so great that fine sand particles can move freely therethrough in the production well. Very fine sand particles, i.e., those particles finer than about 80 mesh, are unsuitable because the resultant barrier had insufficient permeability to permit the flow of formation fluids therethrough. From this discussion it can be appreciated that the type of sand present in the formation which the permeable barrier is to restrain the movement of will to some degree influence the especially preferred particle size of the sand to be introduced into the formation. Thus if very fine sand is present in the formation, then the best result will be attained using sand within the finer range, i.e., from about 40 to about 80 mesh. Similarly, higher production rates can safely be attained in formations whose naturally occurring sand is relatively coarse by means of using the coarser sand grains within the specified range, such as for example 10 to 20 mesh or 20 to 40 mesh sand.

II. INTRODUCTION OF THE ASPHALTIC OR BITUMINOUS PETROLEUM INTO THE SAND

According to one aspect of our invention, the asphaltic or bituminous petroleum naturally occurring in a formation may be utilized as the source of the asphaltic material to form the sand restraining permeable mass. That is to say, if the naturally occurring formation petroleum is highly asphaltic or bituminous, this may be utilized as a part or all of the asphaltic petroleum or formation of the permeable mass. In some instances it is not necessary to add any additional asphaltic petroleum, whereas in others it may be necessary to increase the asphaltic petroleum saturation within this portion of the formation immediately adjacent to the well to be treated, so that a stable barrier may be formed.

When it is desirable to enlarge the cavity and introduce sand rather than use naturally occurring formation sand, it will generally be necessary to also introduce the asphaltic or bituminous petroleum. It should be realized that asphaltic or bituminous petroleum is generally very viscous, and so ordinarily cannot be simply pumped into the sand pack. The viscosity of bituminous petroleum such as is found in tar sand deposits, for example, is in the range of millions of centipoise at formation temperature. The viscosity-temperature relationship of such petroleum is exceedingly sharp, however, and the viscosity of tar sand material drops to a value of only a few centipoise at about 300°F. Accordingly, one method of introducing the bituminous petroleum into the sand pack is simply to heat the petroleum to a temperature of at least 200°F and preferably around 300°F, so as to make the bituminous petroleum pumpable, and introduce the hot bituminous petroleum into the sand pack. It is preferable to preheat the sand pack to a similar temperature, so that the petroleum will not cool too rapidly, and thus the sand pack may be saturated uniformly into the desired depth away from the well bore. The sand pack may be conveniently preheated by passing a heated fluid such as steam through the sand pack prior to introduction of a heated bituminous petroleum into the sand pack.

Another method for coating the granular material with bituminous petroleum involves the formulation of an oil-in-water emulsion which has a much lower viscosity than the petroleum itself. The desired emulsion may be formed by mixing a quantity of bituminous petroleum with water, the ratio of oil to water being from about 1.0 to about 0.01 and preferably about 0.10. The formulation of the emulsion is aided by inclusion of a small amount of an alkalinity agent such as sodium hydroxide in the water. Generally from about 0.01 to about 1 percent by weight sodium hydroxide is satisfactory for this purpose.

After the bituminous petroleum and water emulsion has been formulated, it may easily be pumped down the tubing and/or annular space between the tubing and casing, into the granular material adjacent to the perforations in the production tubing. The sand pack should be throughly saturated with the bitumen and water emulsion. An acid such as hydrochloric acid or sulfuric acid may then be introduced into the saturated sand pack to "break" the emulsion or resolve it into its separate phases. The volume of acid needed to treat the emulsionsaturated sand pack will generally be from about 1 percent to about 50 percent of the volume of emulsion present. The concentration of acid may be from about 1 percent to about 10 percent by weight. When the acid contacts the emulsion and resolves it into its phases, the viscous bituminous petroleum deposits on the sand grains, and the water phase may easily be displaced out of the pack either into the formation or into the well bore and produced to the surface of the earth.

Still another method for saturating the sand pack with bituminous petroleum comprises forming a solution of the bituminous petroleum and a suitable solvent such as benzene, toluene and naphtha so as to form a low viscosity solution, and then pump the solution into the sand pack through the tubing or annular space or both. A suitable gas such as air, nitrogen or carbon dioxide or natural gas may then be passed through the sand or gravel pack to vaporize the solvent, leaving the viscous petroleum deposited on the sand or gravel. The vaporization may be accelerated if an inner gas such as nitrogen is heated to a temperature well above the boiling point of the solvent prior to passing the gas through the sand pack.

III. ASPHALT PRECIPITATING SOLVENT INJECTION

After the asphaltic or bituminous petroleum has been placed in the pore space of the sand or granular material pack adjacent the well bore, a solvent capable of solubilizing the non-asphaltic or non-bituminous fraction of the petroleum, and causing precipitation or deposition of the asphaltic or bituminous fraction of the petroleum on the granular material grains should be introduced into the formation. The solvent may be a low molecular weight hydrocarbon, preferably a paraffinic hydrocarbon having from three to ten carbon atoms such as pentane or hexane. The paraffinic hydrocarbon should be introduced into the formation under temperature and pressure conditions which will result in it entering the sand pack in a liquid form. Accordingly, the temperature should be below about 250° and preferably about 150°, in order to insure that it is essentially all in the liquid phase of the temperature existing in the sand pack being treated. In deeper deposits, which can tolerate higher injection pressures, lower molecular weight paraffinic hydrocarbons such as butane or even propane may be utilized effectively, so long as the temperature and pressure at which the materials are injected are such that the fluid will enter the formation as a liquid.

Another suitable asphalt precipitating solvent for use is N-methyl-2-pyrrolidone whose formula is as follows:

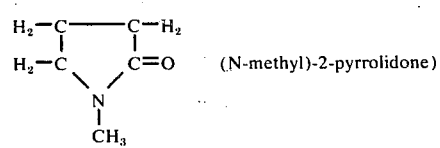

(N-methyl)-2-pyrrolidone

This material should similarly be introduced into the formation in the form of a liquid, in order to insure that it effectively precipitates most of the bituminous or asphaltic material present in the sand pack.

Still another solvent suitable for use in the process of our invention for the purpose of precipitating asphalt is furfural, whose formula is as follows:

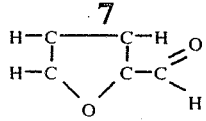

A mixture of any two or more of the above materials may also be used effectively to precipitate the asphaltic or bituminous petroleum fraction of the petroleum.

IV. SOLIDIFICATION OF THE ASPHALT OR BITUMEN

After the asphaltic or bituminous fraction of the petroleum has been precipitated by suitable treatment as described immediately above, the final phase of the process for forming the sand controlled permeable barrier is to introduce a heated fluid, preferably a heated gaseous fluid into the sand pack to vaporize volatile materials present and solidify the asphaltic or bituminous material. Steam is an especially preferred fluid for this purpose, since it is inexpensive and readily available, and equipment for generating steam will frequently be available in the oil field for the thermal recovery stimulation process to be applied later.

Either saturated or super heated steam may be utilized in this step, although ordinarily the preferred embodiment will be to utilize saturated steam because it is less expensive and quite satisfactory for this purpose. So long as the temperature of the sand pack is raised to at least 250°F, the desired solidification of the deposited asphalt will be achieved. It is preferred that the steam temperature be at least 300°F in order to effectively solidify the asphaltic materials in a reasonably short period of time. Ordinarily, the time required for the solidification step will be inversely related to the temperature. Thus, if lower temperature fluids are utilized to heat and solidify the asphaltic material, a longer period of time will be required. If the steam is at least 300°F, the desired solidification occurs within only a few hours. Ordinarily from about 1 to about 12 hours is sufficient to solidify the deposited asphaltic material. Although longer exposure to steam will not be detrimental to the process, and may be utilized if desired, there is no particular advantage to injecting steam into the sand pack for any period of time longer than is necessary to achieve the desired solidification of the asphaltic material.

Any other heated gaseous material may be utilized for the solidification step. For example, air or nitrogen or any other suitable gas may be heated to a temperature of around 300°F and passed through the sand pack to effectively solidify the asphaltic materials and bind the loose sand grains together.

V. FIELD EXAMPLE

The process of our invention may better be understood by reference to the following pilot field example, which is offered only as a preferred illustrative embodiment, and is not intended to be limitative or restrictive of our invention.

A tar sand deposit is to be subjected to steam emulsification drive. A well is drilled into the tar sand deposit, which is located under an overburden whose thickness is about 300 feet and the tar sand deposit thickness is around 75 feet. The tar sand deposit immediately adjacent to the well is under-reamed to create a cavity approximately 3 feet in diameter extending the full 75 foot thickness of the tar sand deposit. A casing is run to the top of the tar sand deposit and a production tubing string is run to the bottom of the tar sand deposit. Perforations are formed over the full 75 foot interval, since it is desired to introduce fluids essentially uniformly into the tar sand interval.

A slurry is formed of 40 to 80 mesh frac sand in water, and this slurry is pumped into the annular space. Water is pumped from the production tubing, to cause the sand grains to pack closely around the perforated production tubing and to form thereby a dense sand pack which substantially fills the cavity around the well. This is continued until calculations indicate that the sand pack is about 1 foot above the top of the perforation.

Prior to introduction of the bituminous petroleum, steam at a temperature of 300°F is pumped into the production tubing to contact the sand pack and heat the sand grains contained therein near a temperature near 300°. Passage of steam therethrough for about 2 hours is sufficient to heat the sand grains.

A quantity of bituminous petroleum obtained from the tar sand material similar to that found in the formation is heated to a temperature of 300°F and introduced into the production string, where it flows out through the perforations and saturates the sand grains. Since the porosity of the sand pack is approximately 20 percent, the volume to be saturated with bituminous petroleum is $(3/2)^2 \times \pi \times 75 \times 0.20 = 105$ cubic feet, which is the amount of bituminous petroleum to be introduced into the tubing string to saturate the sand pack. Approximately 10 percent excess is utilized to assure that good contact between all of the sand and bituminous petroleum is achieved.

Air is slowly passed down the production tubing to cool the bituminous petroleum and sand to about 100° prior to the next step, so that the asphalt participating solvent will not be vaporized upon contacting the hot material.

Hexane is chosen as the asphalt precipitating solvent, since it is not desired to exceed the overburden-related pressure limitation and since it is necessary that the solvent enter this sand pack in a liquid form. Approximately 50 gallons of hexane is pumped slowly into the injection tubing. During this time the annular space is closed off so the hexane with portions of the petroleum dissolved therein will enter the formation rather than pass back up the tubing. After the hexane has been pumped into the sand pack, steam at a temperature of 325° is introduced into the sand pack for approximately 6 hours so as to solidify the precipitated asphalt, to bind the sand grains together and form the desired permeable mass for sand control purposes.

The well treated according to the above discussion is utilized as the production well and the subsequently applied steam-emulsification drive process, and no problems are encountered in connection with movement of unconsolidated sand into the well bore, and further that the permeable mass formed in accordance with the above described procedure is not affected by subsequent contact with steam and caustic.

VI. EXPERIMENTAL SECTION

The following laboratory experiments were performed to verify the operability and determine the effectiveness of the process of our invention. A linear laboratory cell approximately 7 inches in length and 1.4 inches in diameter was packed with a sample of athabasca tar sand to a density of 1.8 grams per cubic centimeter. A total of 145 cubic centimeters of liquid normal butane was injected into the sand pack in five slugs averaging 29 cubic centimeters per slug, each slug being depleted by normal butane vapor pressure. Steam at a temperature of 294°F was then introduced into the cell to displace the oil. After completion of this experiment, the contents of the cell was examined and it was noted that the 3 inches into the cell from the point of injection was consolidated by dark precipitates, and the portion immediately adjacent to the injection well was very well consolidated and permeable.

Thus we have disclosed and demonstrated that a sand controlling permeable mass may be formulated by contacting a mixture of sand and asphaltic or bituminous petroleum, which may be naturally occurring or may be placed in the well bore for the purpose of forming the permeable mass, by contacting same with an effective asphalt precipitating solvent such as a liquid paraffinic hydrocarbon, as well as with furfural or N-methyl-2-pyrrolidone, and thereafter introducing steam or any other heated fluid into the zone for the purpose of dehydrating and solidifying the asphaltic material. The asphaltic material binds the sand grains together, forming a permeable mass which will effectively restrain the flow of sand into the well bore during periods of recovery of fluid therefrom.

While our invention has been disclosed in terms of a number of illustrative embodiments, it is not limited since many variations thereof will be apparent to persons skilled in the art without departing from the true spirit and scope of our invention. Similarly, while reactions and mechanisms have been proposed to explain the benefits resulting from the application of the process of our invention, it is not necessarily hereby represented that these are the only or even the principal reactions and mechanisms occurring, and we do not wish to be bound by any particular mechanism or reaction. It is our intention that our invention be limited and restricted only by those limitations and restrictions as appear in the claims appended immediately hereinafter below.

We claim:

1. A method of treating a subterranean, asphaltic or bituminous petroleum containing formation, which formation contains unconsolidated sand, said formation being penetrated by at least one well in fluid communication with the subterranean formation, for the purpose of forming a sand restraining permeable barrier, comprising
    a. introducing asphalt precipitating solvent selected from the group consisting of paraffinic hydrocarbons having from 3 to 10 carbon atoms, furfural, N-methyl-2-pyrrolidone and mixtures thereof; and
    b. introducing a heating fluid into the formation to heat the formation contacted by the asphaltic precipitating solvent, to solidify the asphalt on the sand grains, so that a barrier is formed around the well bore.

2. A method of treating a subterranean formation penetrated by at least one well to form a permeable, sand restraining solid barrier around the well, said formation containing unconsolidated sand and petroleum having appreciable bituminous or asphaltic content, comprising:
    a. introducing a liquid asphalt precipitating solvent selected from the group consisting of paraffinic solvent having ten or less carbon atoms, furfural, N-methyl-2-pyrrolidone, and mixtures thereof; and
    b. introducing a heated, gaseous fluid selected from the group consisting of steam, air, nitrogen and mixtures thereof at a temperature of at least 250°F to solidify the precipitated asphalt.

3. A method as recited in claim 2 wherein the paraffinic solvent is selected from the group consisting of pentane and hexane.

4. A method as recited in claim 3 wherein the solvent is hexane.

5. A method as recited in claim 3 wherein the solvent is pentane.

6. A method as recited in claim 2 wherein the solvent is furfural.

7. A method as recited in claim 6 wherein the solvent is N-methyl-2-pyrrolidone.

8. A method as recited in claim 2 wherein the heated, gaseous fluid is steam.

9. A method as recited in claim 2 wherein the liquid asphalt-precipitating solvent is injected at a temperature below 150°F.

* * * * *